United States Patent [19]
Taira et al.

[11] Patent Number: 5,940,583
[45] Date of Patent: *Aug. 17, 1999

[54] IMAGE FORMING APPARATUS

[75] Inventors: Masayoshi Taira, Yokohama; Yoshihiro Hosomi, Yokohamai; Hirokazu Takahashi, Yokohamai; Yoshio Mizuno, Ichikawa; Tokuharu Kaneko, Yokohama; Satoshi Kaneko, Kawasaki; Taisei Fukada, Nagaokakyo; Keizo Isemura, Koganei; Akihiko Satoh, Kawasaki; Hirohiko Kishimoto, Kawasaki; Masahiro Serizawa, Yokohama; Noriaki Matsui, Yokohama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/556,700

[22] Filed: Nov. 13, 1995

[30] Foreign Application Priority Data

Nov. 15, 1994 [JP] Japan .................................. 6-280497
Nov. 15, 1994 [JP] Japan .................................. 6-280498

[51] Int. Cl.⁶ ........................... H04N 1/21; H04N 1/387; H04N 1/40; G06F 15/00
[52] U.S. Cl. ........................ 395/114; 395/148; 358/296; 358/453; 358/462

[58] Field of Search .................................... 358/296, 401, 358/426, 450, 403, 404, 453, 444, 442, 434, 436, 438, 440, 498, 462; 382/176, 180; 395/162, 148, 792, 164, 145, 146, 147, 774, 775, 776

[56] References Cited

U.S. PATENT DOCUMENTS

| | | | |
|---|---|---|---|
| 4,860,376 | 8/1989 | Tanaka et al. | 382/180 |
| 4,907,283 | 3/1990 | Tanaka et al. | 382/180 |
| 5,220,394 | 6/1993 | Kato et al. | 355/309 |
| 5,319,745 | 6/1994 | Vinsonneau et al. | 395/144 |
| 5,339,169 | 8/1994 | Meguro et al. | 358/403 |
| 5,396,588 | 3/1995 | Froessl | 395/145 |
| 5,444,840 | 8/1995 | Froessl | 382/181 |
| 5,509,092 | 4/1996 | Hirayama et al. | 382/181 |
| 5,666,139 | 9/1997 | Thielens et al. | 345/173 |

*Primary Examiner*—Edward L. Coles
*Assistant Examiner*—Mark Wallerson
*Attorney, Agent, or Firm*—Fitzpatrick, Cella, Harper & Scinto

[57] ABSTRACT

The apparatus reads an original by an image reader, and if it recognizes caption(s) included in the original, stores a page number of the original into a memory, thereafter, performs copying based on the stored page number such that the original page including the caption is transferred onto the front side of a recording sheet.

18 Claims, 14 Drawing Sheets

FIG. 13

TABLE OF CONTENTS

CHAPTER ONE WAY TO SOFTWARE ENGINEER

1.1  WHAT IS INTELLIGENCE? ---------------- 1
    1.2  WHAT IS STRENGTH? ---------------- 2
    1.3  WHAT IS LUCK? ---------------- 3

(1601, 1602, 1603)

IMAGE FORMING APPARATUS

BACKGROUND OF THE INVENTION

This invention relates to an image forming apparatus which has a character recognition function.

When a user would like to copy a document so that a page with a caption is front side, in double-sided copying from the document having a plurality of single-sided/double-sided pages, the user has to manually divide the pages into several sets of pages each having a page with a caption on top, and performs a plurality of jobs using a copying machine. Thus, copying operation in this case has been troublesome.

Further, an operator conventionally looks through the content of the document, and forms a table of contents using a word processor and the like, then prints out the table of contents. In this manner, this operation is also tiresome.

SUMMARY OF THE INVENTION

Accordingly, the present invention has been made to solve the above situation and has its object to provide an image forming apparatus which attains improved utility by controlling output such that a page of document including specific character(s) is copied on the front side of a recording sheet.

According to the present invention, the foregoing object is attained by providing an image forming apparatus, comprising: original reading means for reading an original; character recognition means for performing character recognition on the original read from the original, by the original reading means; extraction means for extracting a specific character array included in the original, based on the results of recognition by the character recognition means; memory means for storing page information of the original including the specific character array; and control means for controlling output based on the page information stored in the memory means.

In accordance with the present invention as described above, the apparatus reads an original document page, performs character recognition, and extracts a specific character array, included in the document, based on the recognition results. Then, the apparatus stores the page number of the document page including the extracted specific character array, and controls outputting based on the stored page number.

Another object of the present invention is to provide an image forming apparatus which automatically edits a table of contents of document, thus attains improved utility.

According to the present invention, the foregoing object is attained by providing an image forming apparatus which automatically edits a table of contents by using a character recognition function, comprising: extraction means for extracting contents information indicative of a caption of an original and a page number of the original, by using the character recognition function; storage means for storing the contents information extracted by the extraction means; and output means for editing a table of contents, based on the-contents information stored in the storage means and outputting the table of contents.

In accordance with the present invention as described above, the apparatus extracts a caption of document part and content information including the page number of the page including the caption, using a character recognition function, stores the extracted content information, edits a table of contents based on the stored content information, and outputs the edited table of contents.

Further, the present invention provides an image forming apparatus which automatically edits a table of contents by using a character recognition function, comprising: extraction means for extracting contents information indicative of a caption of an original and a page number of the original, by using the character recognition function; counter means for counting the number of pages of the original; storage means for storing the caption extracted by the extraction means and a count value indicative of the number of pages counted by the counter means, as contents information; and output means for editing a table of contents, based on the contents information stored in the storage means and outputting the table of contents.

In accordance with the present invention as described above, the apparatus extracts a caption of document part using a character recognition function, counts the number of pages of the document, stores the extracted caption and the count value as content information, edits a table of contents based on the stored content information, and outputs the edited table of contents.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 13 is an example of a table of contents; and

DETAILED DESCRIPTION OF THE PREFERRED EMBODIMENTS

Preferred embodiments of the present invention will now be described in detail in accordance with the accompanying drawings.

[First Embodiment]

Figure 1:
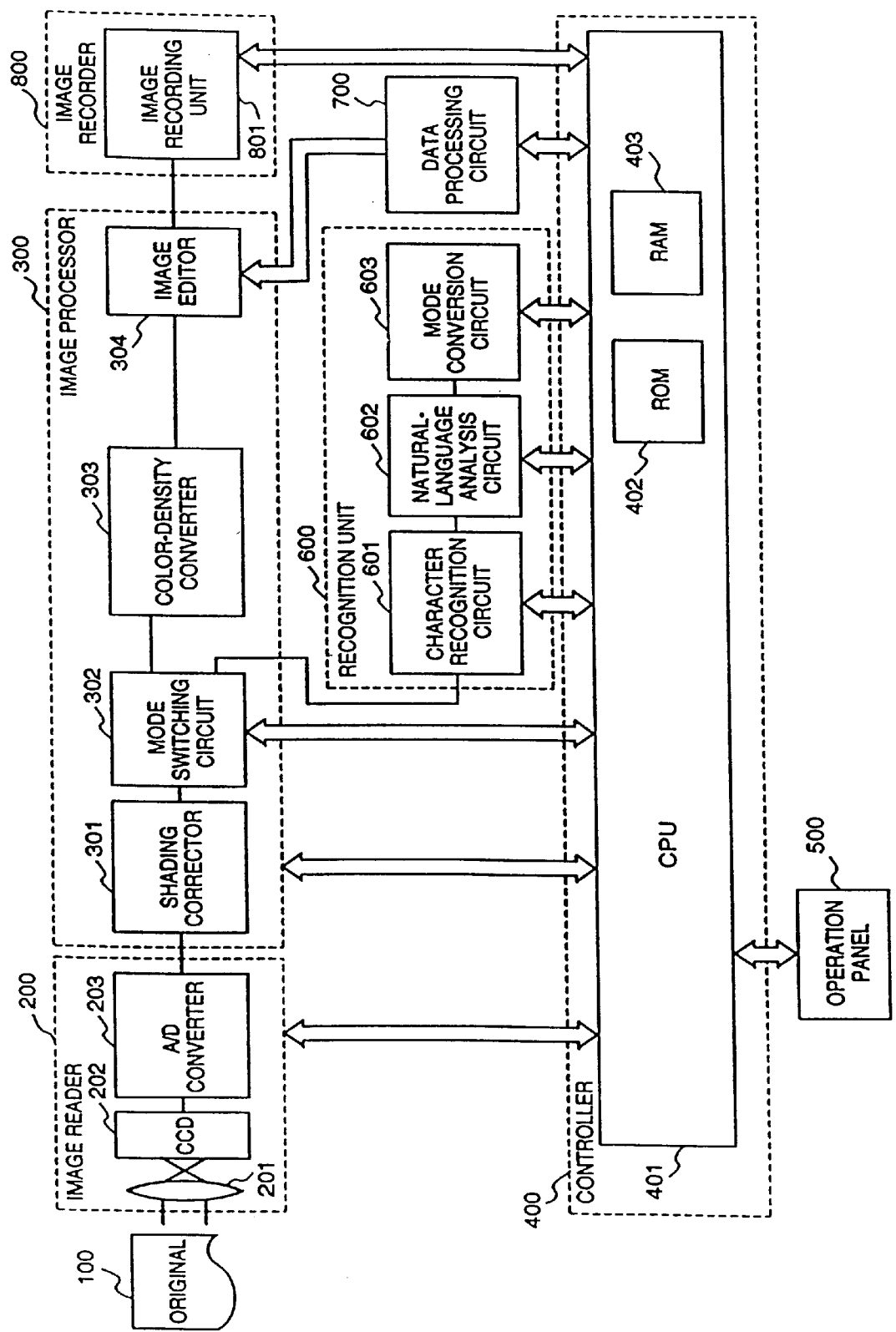
FIG. 1 is a block diagram showing the construction of an image copying apparatus according to a first embodiment of the present invention.

FIG. 1 is a block diagram showing the construction of an image copying apparatus according to a first embodiment of the present invention. As shown in FIG. 1, an original 100 is optically read by an image reader 200, and reflected light from the original is inputted into an A/D converter 203, via a CCD line sensor 202, then an A/D-converted signal is inputted into an image processor 300. At the image processor 300, first shading correction is performed by a shading corrector 301 on the input image signal, and switching of signal-output destination is made by mode switching circuit 302, based on set current mode, i.e., image processing setting mode or copying mode. If the mode is copying mode, the image signal is density-converted by a color-density converter 303, and outputted to an image editor 304. Prior to processing at the image editor 304, data-setting processing is performed by a data processing circuit 700 on the image signal, in accordance with data as settings such as image processing setting, stored in an RAM 403 of a controller 400. The set data processing is transferred to the image editor 304, and processing is performed on the image signal. When the processing at the image processor is completed, the processed image signal is outputted to an image recording unit 801 which comprises a control circuit for a motor for conveying recording sheets, a laser-recording circuit for writing the image signal inputted from the image processor 300 into an electrostatic drum, and a development control circuit for performing development. Note that an image recorder 800 will be described in detail later.

If the current mode is image processing setting mode, the mode switching circuit 302 switches the output of image signal to a recognition unit 600. At the recognition unit 600, first, a character recognition circuit 601 separates an image by one character (character pattern) from the input image and performs character recognition. The character recognition circuit 601 has a dictionary for character recognition. As the character recognition is completed, a natural-language analysis circuit 602 analyzes each character code and forms a word, further analyzes the meaning of the word, and converts the word into a knowledge code. As the natural-language analysis is completed, the knowledge code is outputted into a mode conversion circuit 603. The mode conversion circuit 603 has an inference circuit which infers the correspondence between the knowledge code generated by the natural-language analysis circuit 602 and content of knowledge base. Note that the ROM 402 and RAM 403 of the controller 400 respectively hold general knowledge base and knowledge base unique to the apparatus. The unique knowledge base is updated each time the image processing mode is activated, through the apparatus' own learning function.

At the inference circuit (603), if the knowledge code corresponds with the content of the image processing setting, the current mode is converted to image processing mode. If the knowledge code does not correspond with the content of the image processing setting, a CPU 401 of the controller 400 displays a mode setting image for setting the appropriate mode on an operation panel 500, based on the knowledge code, thus advising a user to input a setting. As the setting is made on the operation panel 500, the image processing mode is stored into the RAM 403 of the controller 400. Then, the processing at the mode conversion circuit 603 is over.

The operation panel 500 has a group of various keys for designating image editing contents to the image processor, and image copying operation such as the number of copies, a zoom ratio and the like, a group of various LED's and a display panel for displaying the content of operation and the like. Note that the operation panel 500 will be described in detail with reference to FIG. 3. later.

Figure 2:
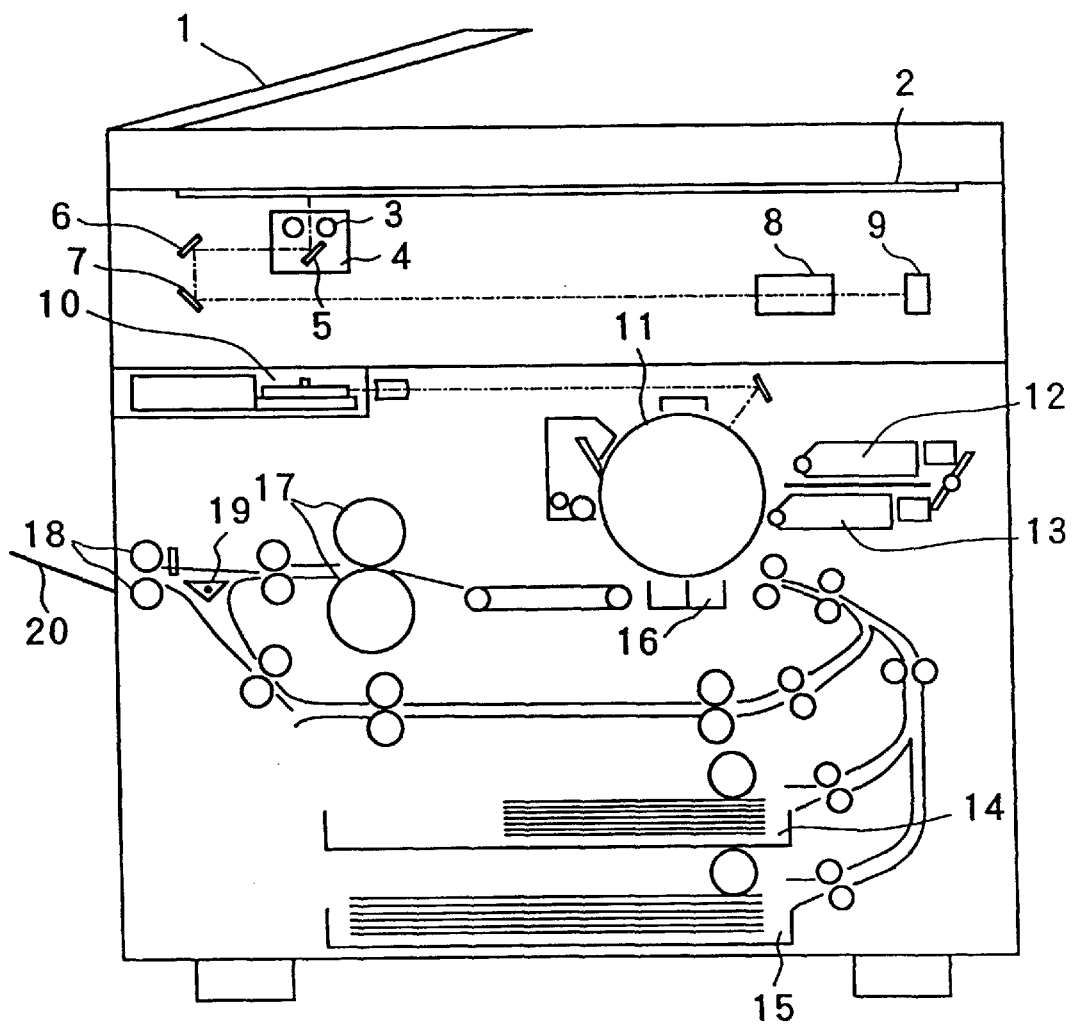
FIG. 2 is a cross-sectional view of the entire structure of the image copying apparatus according to the first embodiment.

FIG. 2 is a cross-sectional view of the structure of the image copying apparatus of the present embodiment. In FIG. 2, reference numeral 1 denotes a document feeder (DF) as document feeding means, for feeding document set therein to a predetermined position on a glass platen 2, by one or serially two sheets. Numeral 4 denotes a scanner comprising a lamp 3 and scanning mirrors 5 to 7. When the original fed by the original feeder 1 is placed on the glass platen 2, the scanner 4 reciprocates in a predetermined direction. Light reflected from the original is passed through a lens 8 via the scanning mirrors 5 to 7, and focused on an image sensor 9 into an image. Numeral 10 denotes an exposure controller, comprising a laser scanner, for emitting a light beam modulated based on the image data outputted from the image processor onto an electrostatic drum 11; 12 and 13, developers for visualizing the electrostatic image formed on the electrostatic drum 11 with developing material (toner) in a predetermined color; and 14 and 15, paper trays on which a predetermined-sized recording sheets accumulated, then conveyed to a resist roller by drive of a convey roller. The recording sheets are re-fed at timing where the top end of the sheet meets with the end of the image formed on the electrostatic drum 11.

Numeral 16 denotes a separating discharger for separating a recording sheet from the electrostatic drum 11 after the toner image developed on the electrostatic drum 11 has been transferred onto the recording sheet; 17, a fixing unit for fixing the toner image onto the recording sheet; 18, a discharge roller for discharging the recording sheet on which the image formation has been completed onto a tray 20; and 19, a direction flapper for switching a direction for conveying the recording sheet after the image formation to discharge orifice or internal conveyance direction for overlaying/double-sided image formation process.

<Operation Panel>

Figure 3:
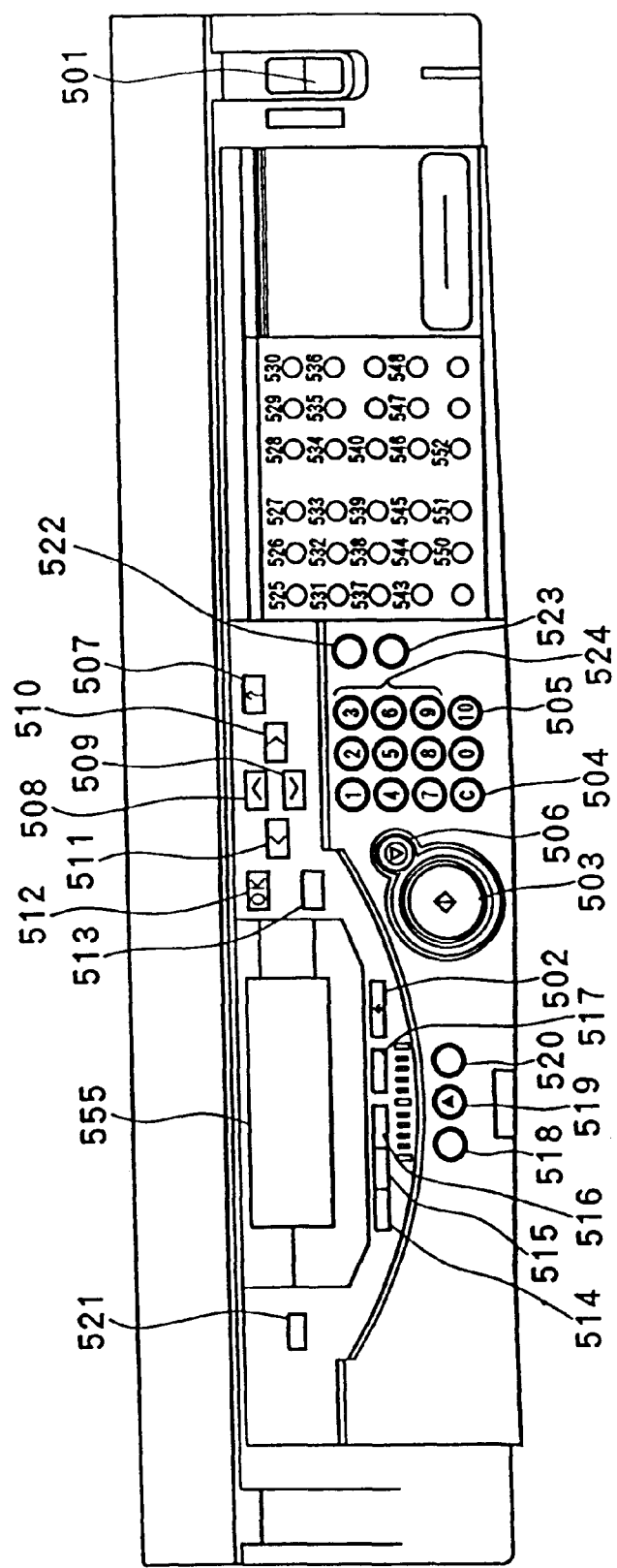
FIG. 3 is a top plan view of an operation panel of the copying apparatus according to the first embodiment.

FIG. 3 is a top plan view of the construction of the operation panel 500 of the present embodiment.

In FIG. 3, numeral 501 denotes a power switch for controlling the turning on/off of the apparatus; 502, a reset key for setting a current mode to a standard mode in a stand-by status; 503, a copy start key; 504, a clear key for clearing numerical values; 505, an ID key for enabling copying operation with respect to a specific user, but prohibiting copying with respect to the others; 506, a stop key for halting or canceling copying operation; 507, a guide key for guidance of various functions; 508, an upper cursor key for moving a cursor in various setting images upward; 509, a lower cursor key for moving the cursor in the various setting images downward; 510, a right cursor key for moving the cursor in the various setting images rightward; 511, a left cursor key for moving the cursor in the various setting images leftward; 512, an OK key for confirming set contents in the various setting images; and 513, an execute key for executing content outputted at a lower right portion of a display screen to be described later in the various setting images.

Numeral 514 denotes a standard-size reduction key for reducing standard copying size to another; 515, a same-size copying key for selecting same-size copying; 516, a standard-size magnification key for magnifying a standard copying size; 517, a cassette selection key for selecting the paper cassette to be used in copying; 518, a copying density adjustment key for lowering the copying density; 519, an AE key for automatically adjusting the copying density with respect to the density of original; 520, a copying density adjustment key for increasing the copying density; 521, a sorter operation designation key; 522, a preparatory heating key for ON/OFF of a preparatory heating mode; and 524, ten keys for inputting numerical values.

Numeral 525 denotes a marker processing key for setting trimming, masking, partial processing (outline processing, hatching, shadow-adding, negative/positive processing (reversing the gradations)) etc.; 526, a pattern processing key for representing colors by patterns or difference of densities; 527, a color deletion key for deleting a specific color; 528, an image quality key for setting an image quality; 529, a negative/positive key for negative/positive processing; 530, a image create key for outline processing, hatching, shadow-adding, italic processing, mirror processing and repeat processing; 531, a trimming key for designating an image area and performing trimming on the area; 532, a masking key for designating an image area and masking the area; 533, a partial processing key for designating an image area and designating a partial processing (outline processing, hatching, shadow-adding, negative/positive processing); and 534, a frame deletion key for deleting a frame of an original image in accordance with a set mode. Note that frame-deletion modes include a sheet-frame deletion mode (for forming a frame in accordance with a several sheet size), an original-frame deletion mode for forming a frame in accordance with an original size designated), a book-frame deletion mode (for forming blank spaces at the central portion and the peripheral portions of an original in accordance with a spread book size designated).

Numeral 535 denotes a binding-margin key for forming a binding margin at one end of a recording sheet; and 536, a movement key for movement. Note that the movement includes parallel movement (upward/downward/rightward/leftward), centering, movement to a corner and a designated movement (point designation. Numeral 537 denotes a zoom key for 1%-base setting of zooming ratio from 25% to 400%. Note that zooming ratio can be separately set for main-scanning and subscanning. Numeral 538 denotes an auto-zoom key for automatically changing a zooming ratio in accordance with a recording sheet size. Note that the auto-zooming ratio can be separately set for main-scanning and subscanning. Numeral 539 denotes a magnification & successive copy key for copying where an original image is magnified into a plurality of copies. Numeral 540 denotes a reduction layout key for copying where a plurality of original images are reduced into one page.

Numeral 543 denotes a successive copy key for dividing a copying range of the glass platen into right and left portions and automatically performing copying by two pages (successive page copying, double-sided copying); 544, a double-sided copy key for double-sided copying (one-sided original to double-sided copy, successive pages to double-sided copy, double-sided original to double-sided copy); 545, an overlaying key for overlaying (overlaying, overlaying of successive pages); 546, a memory key for a mode using a memory (memory synthesizing, area synthesizing, openwork synthesizing); 547, a projector key used when a projector is used; 548, a printer key for making settings of a printer; 550, a different-size key used when the sizes of pages of an original are different upon copying the original; 551, a mode memory key for reading a registered copying mode to register a set copying mode; 552, a mode switching key for switching of the copying mode and image processing setting mode; and 555, a display image for displaying apparatus status, the number of copies, a copying ratio and a size of recording sheet, and in setting of a copying mode, displaying setting contents.

<Copying Operation>

Figure 4:
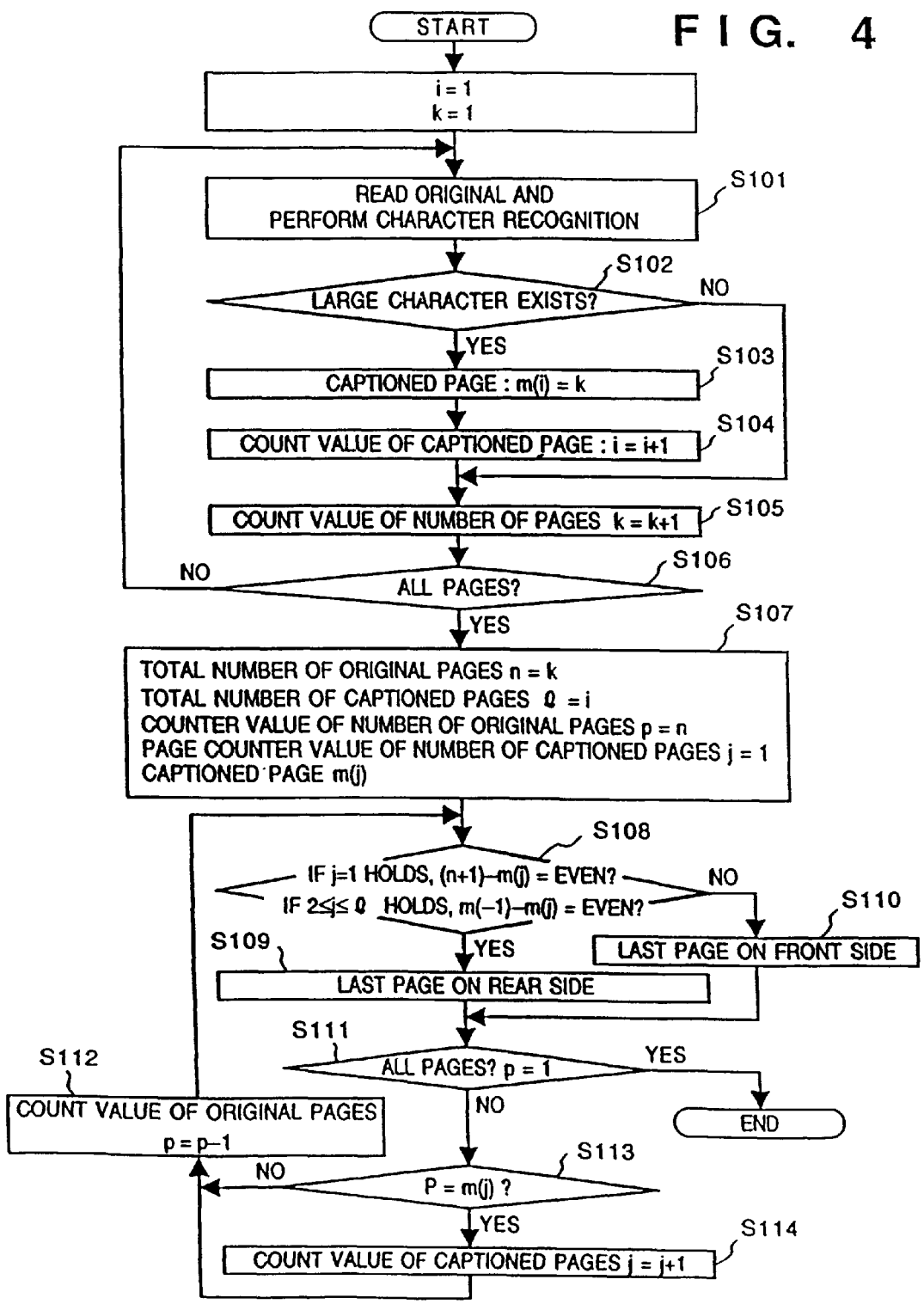
FIG. 4 is a flowchart showing copying operation according to the first embodiment.

Next, copying operation according to the present embodiment, to output an image of a page including a caption on the front side of a recording sheet, will be described with reference to the flowchart of FIG. 4.

It should be noted that the description will be made on the assumption that a count value i indicative of a page number of a page including a caption is "1", and an initial count value k of the number of pages of original is "1".

First, at the operation panel, as the copying mode is set to "single-sided→double-sided: caption mode" or "double-sided→double-sided: caption mode" and the start key is pressed, the document feeder 1 feeds an original (total number of pages: n), from the last page (n-th page), to the glass platen 2. The image reader 200 reads information of the original, then outputs the information to the recognition unit 600, and character recognition is performed on the input information (S101). As the recognized results are outputted to the CPU 401, the CPU 401 examines character sizes of the input recognized results (S102), and if it finds a large-sized character, it regards the character as a caption letter, and stores the page including the character (m(i)=k) into the RAM 403 (S103).

Then, the page number of the captioned page (a page including caption(s)) is counted (i=i+1 (S104)) and the number of pages of original is counted (k=k+1 (S105)). If the character sizes are equal to each other, only the number of pages of original is counted. In this manner, character recognition with respect to all the document pages has been completed (S106), copying operation is performed.

Assuming the total number of original pages is n (n=k), the total number of captioned pages is i, the current count value of the number of original pages is p (initial value p=n), the count value of the captioned pages is j (initial value j=1), and the captioned page is m(j) (S107), when j=1 holds, if the number of pages (n+1−m(1) from the last page (n) to the first captioned page (m(1)) is an even number (S108), copying is controlled such that the last page image is outputted onto the back side of a recording sheet (S109), on the other hand, if an odd number, copying is controlled such that the last page image is outputted onto the front side of the recording sheet (S110).

When copying has been completed to the first captioned page (S113), the number of captioned page is counted (j=j+1 (S114)), and the number of original pages is counted (p=p+1 (S112). Thereafter, if the number of pages (m(j−1)−m(j)) from the (j−1)th captioned page (p=m(j)−1) to the next page of j-th captioned page (p=m(j)−1) is an even number (S108), the (m(j)−1)th page image is transferred onto the back side of a recording sheet and the (m(j)−2)th page image is transferred onto the front side of the recording sheet (S109), while if an odd number, the (m(j)−1)th page image is transferred onto the front side of a recording sheet, then the recording sheet is discharged with it back side blank, and the (m(j)−2)th page image is transferred onto the back side of another recording sheet (S110).

The above operation is repeated until all the original pages have been copied (S111), when the CPU 401 ends the copying operation.

Figure 5:
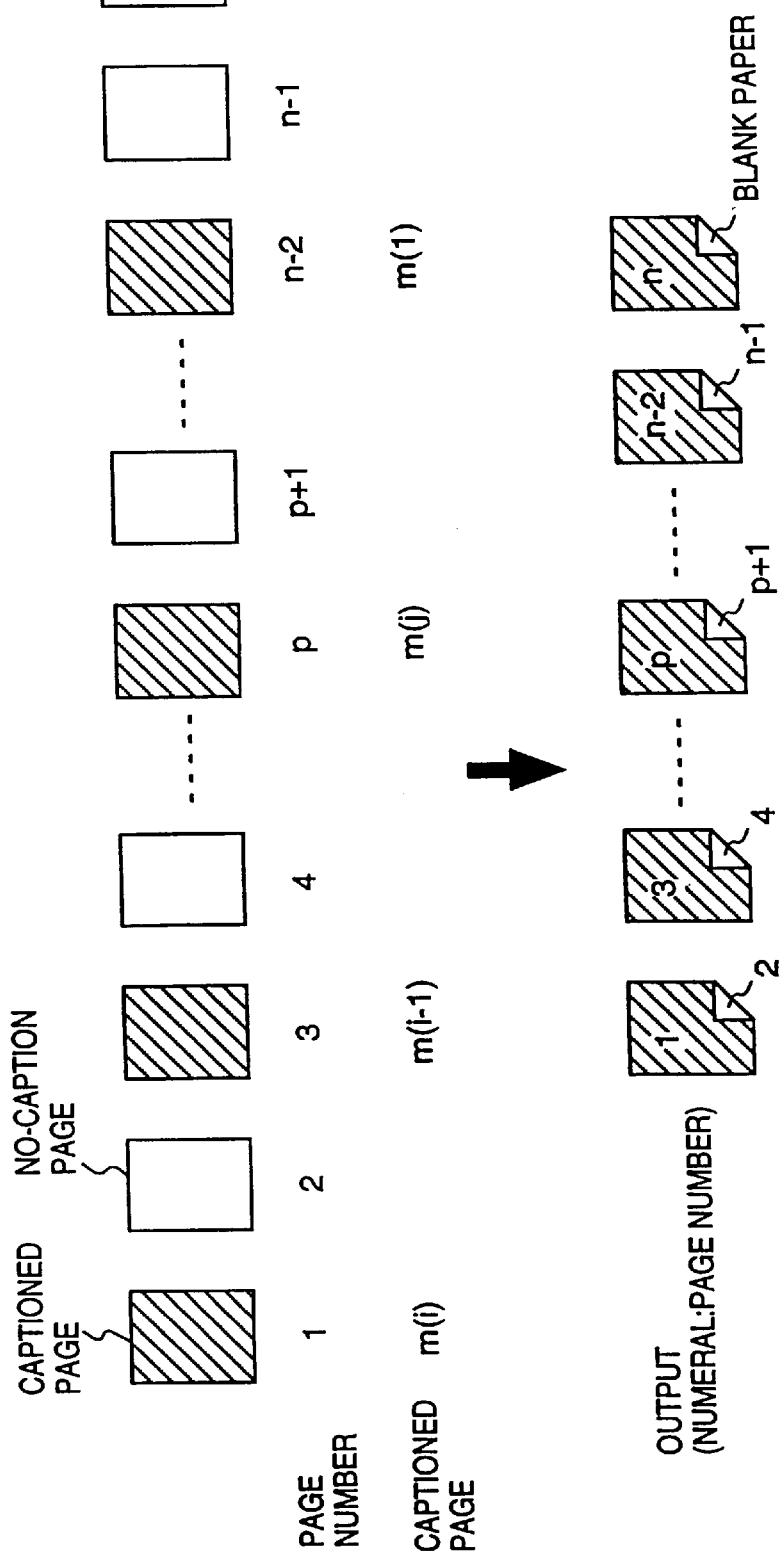
FIG. 5 is an explanatory view showing the relation between original document and output recording sheet.

FIG. 5 is an explanatory view showing recording sheets outputted by the above copying operation. As shown in FIG. 5, captioned pages (1, 3, p, n−1) are transferred onto the front side of recording sheets.

Figure 6:
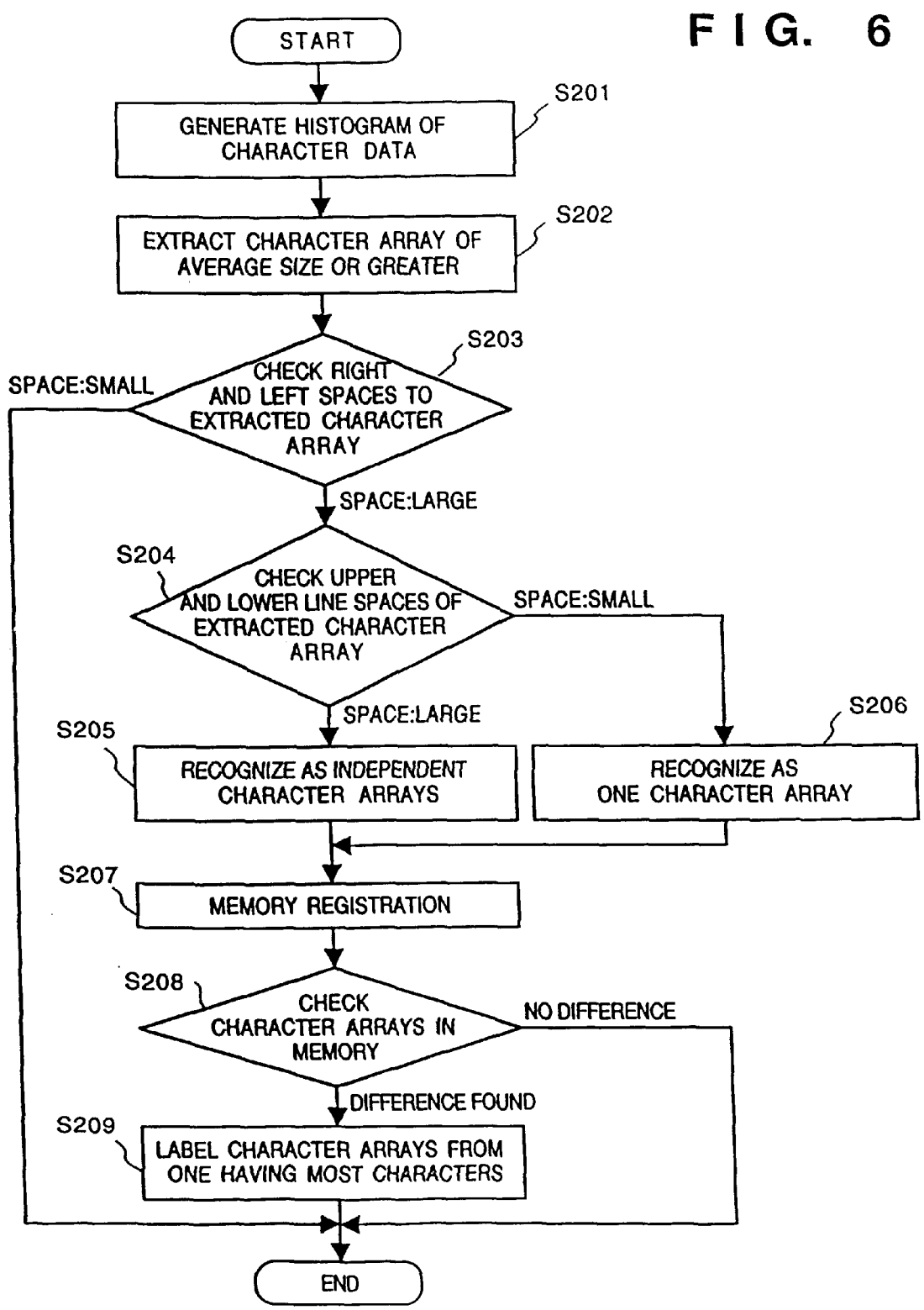
FIG. 6 is a flowchart showing caption-extraction processing according to the first embodiment.
Figure 7:
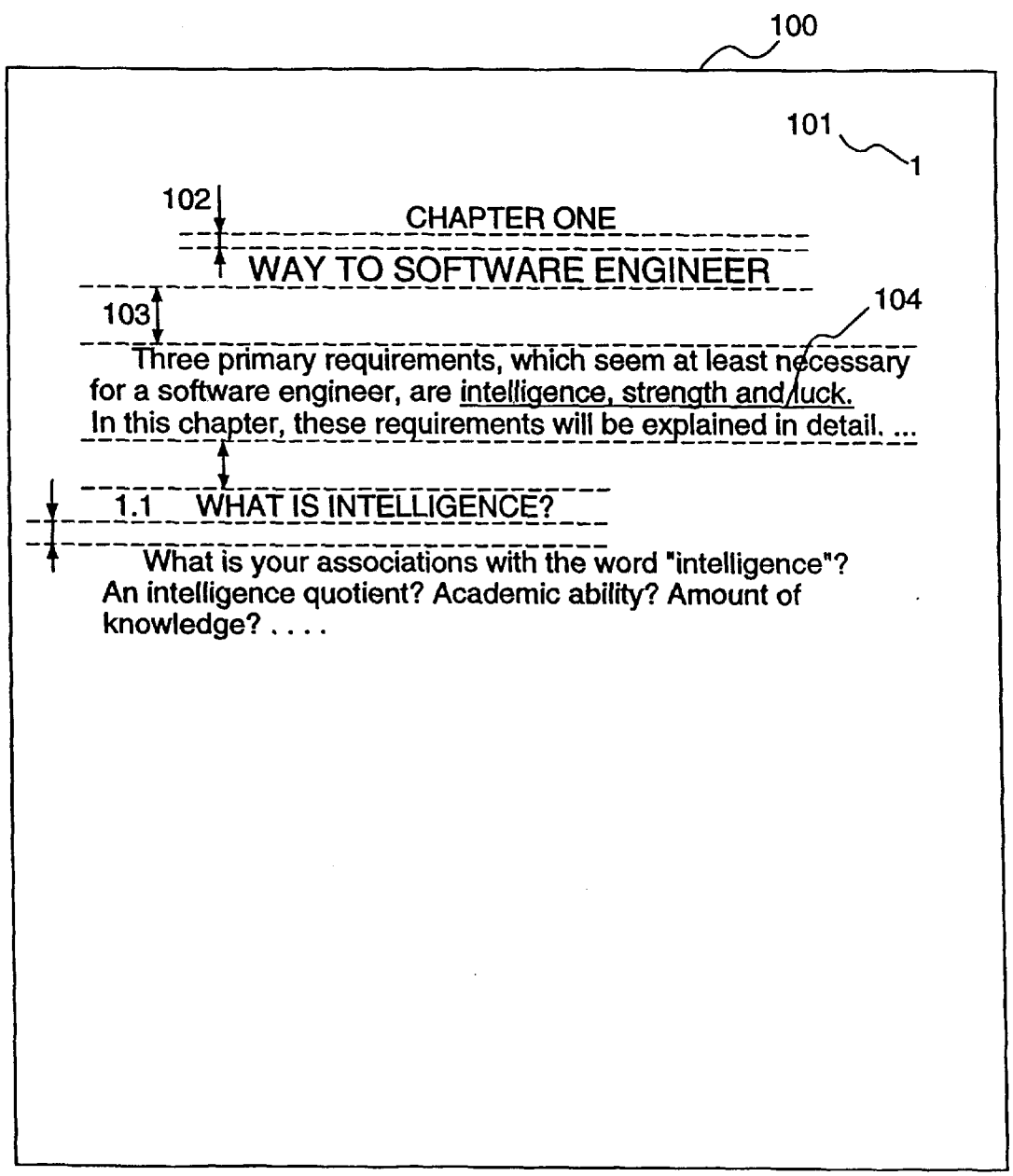
FIG. 7 is an example of an original document page.

Next, the above caption extraction method will be described in detail with reference to the flowchart of FIG. 6 and the sample original 100 shown in FIG. 7.

Upon caption extraction at the recognition unit 600, first, character recognition is performed on the whole original page, and a histogram of character data is generated (S201). Then, character arrays having a size larger than an average character size are cut out (S202). Next, the extracted character arrays are checked (S203) to determine whether or not right and left spaces to the character arrays are larger than a predetermined standard value as space between character arrays from the histogram. If the right and left spaces to the character arrays are larger than the predetermined standard value, the line spaces of the extracted character arrays are checked (S204). Otherwise, if the right and left spaces to the character arrays are less than the predetermined standard value, it is determined that there is no caption in the page, and the process ends.

Next, in the line space check (S204), if the upper and lower line spaces are larger than a predetermined standard value as line space between character arrays from the histogram, it is determined that the extracted character arrays are independent character arrays, and the character arrays are separately recognized (S205). In FIG. 7, numeral 102 and 103 denote character arrays having line spaces larger than the predetermined standard value, and 104, a character array having line spaces less than the predetermined standard value. If the line spaces of the extracted character arrays are less than the predetermined standard value, the character arrays are recognized as one character array (S206). Next, the recognition results are stored into the RAM 403 (S207), and registered character arrays are checked (S208) to determine whether there is difference(s) in the histogram (size difference(s) among the registered character arrays). If there is difference(s) in the histogram, the character arrays are labeled from an array having the most characters (S209), while if there is no difference in the histogram, the process ends.

As described above, according to the present embodiment, it is possible to automatically form a double-sided copy where a page including caption(s) is outputted on the front side of a recording sheet, without user's manual operation.

According to the embodiment, utility can be improved by controlling image output regarding an original page including specific character array(s).

[Second Embodiment]

Next, a second embodiment of the present invention will be described below [with reference to the drawings]. The second embodiment is a construction for extracting caption (s) and a page number of the captioned page, and automatically editing a table of contents.

First, an OCR principle of the present embodiment will be described with reference to FIG. 8.

Figure 8:
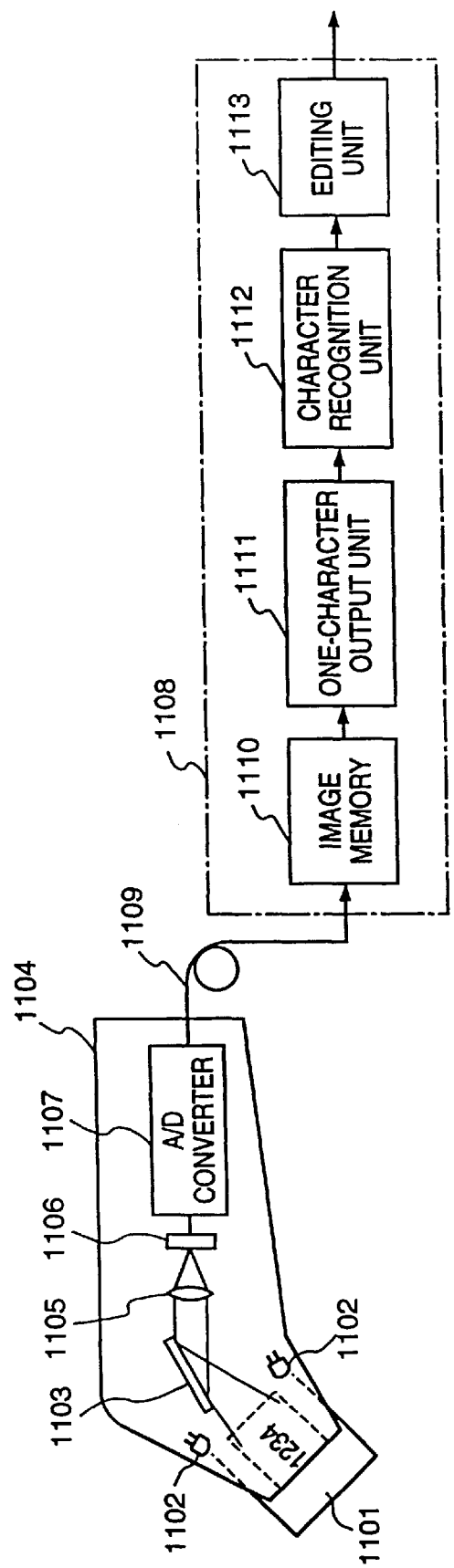
FIG. 8 is a block diagram for explaining the principle of OCR operation.

In FIG. 8, an original 1101 is scanned by an exposure system 1102 of an image reader 1104. The reflection light from the original is focused on a CCD 1106 via a mirror 1103 and a lens 1105, binarized by an A/D converter 1107, and inputted into an image processor 1108. Next, at the image processor 1108, the binary data is stored into an image memory 1110, then images, one character at a time (character patterns), are separated by a one-character cutout unit 1111, from the binary data in the image memory 1110, and character-recognized by a character recognition unit 1112. Note that the image processor 1108 has a dictionary for character recognition. The one-by-one converted characters are edited by an editing unit 1113.

Figure 9:
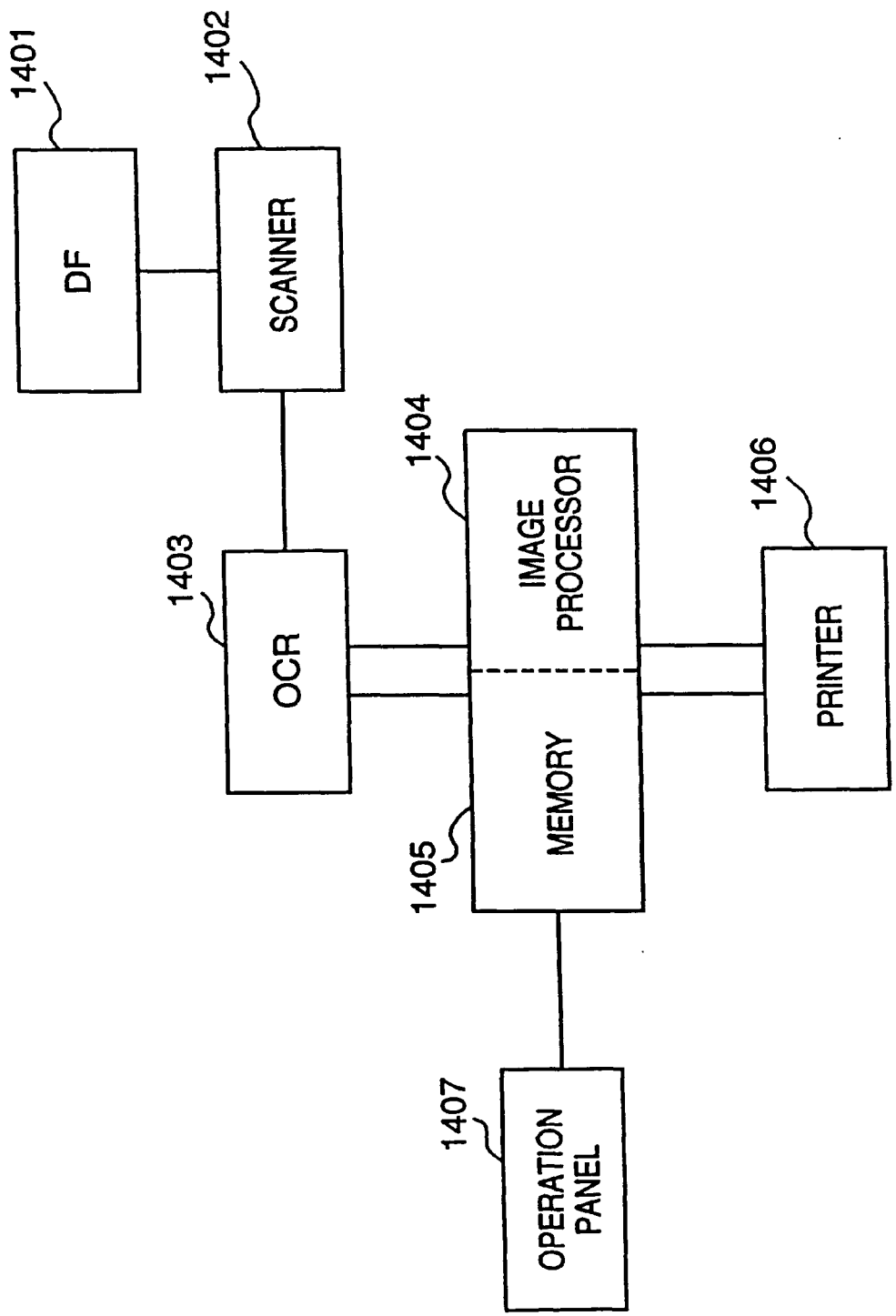
FIG. 9 is a block diagram showing the construction of a second embodiment comprising an OCR and an image copying apparatus.

FIG. 9 is a block diagram showing the construction of the second embodiment comprising the OCR and an image copying apparatus. Next, automatic editing of table of contents will be described with reference to FIG. 9.

First, a DF 1401 feeds a page-numbered original document, of which a user wants to form a table of contents, to a DF 1401, and the scanner 1402 reads the original. Then, an OCR 1403 performs character recognition on image data read by the scanner 1402 from the original, and extracts caption(s) and a page number from the recognized characters. If caption(s) is found in the image, the caption and the page number are stored, as a pair, into a memory 1405. Next, an image processor 1404 arranges the captions stored in the memory 1405 in numerical order based on the page numbers, and a printer 1406 outputs the arranged captions as a table of contents. Note that upon arranging the captions, if correction on the table of contents to be outputted is required, the table of contents is corrected by input from an attached operation panel 407.

Figure 10:
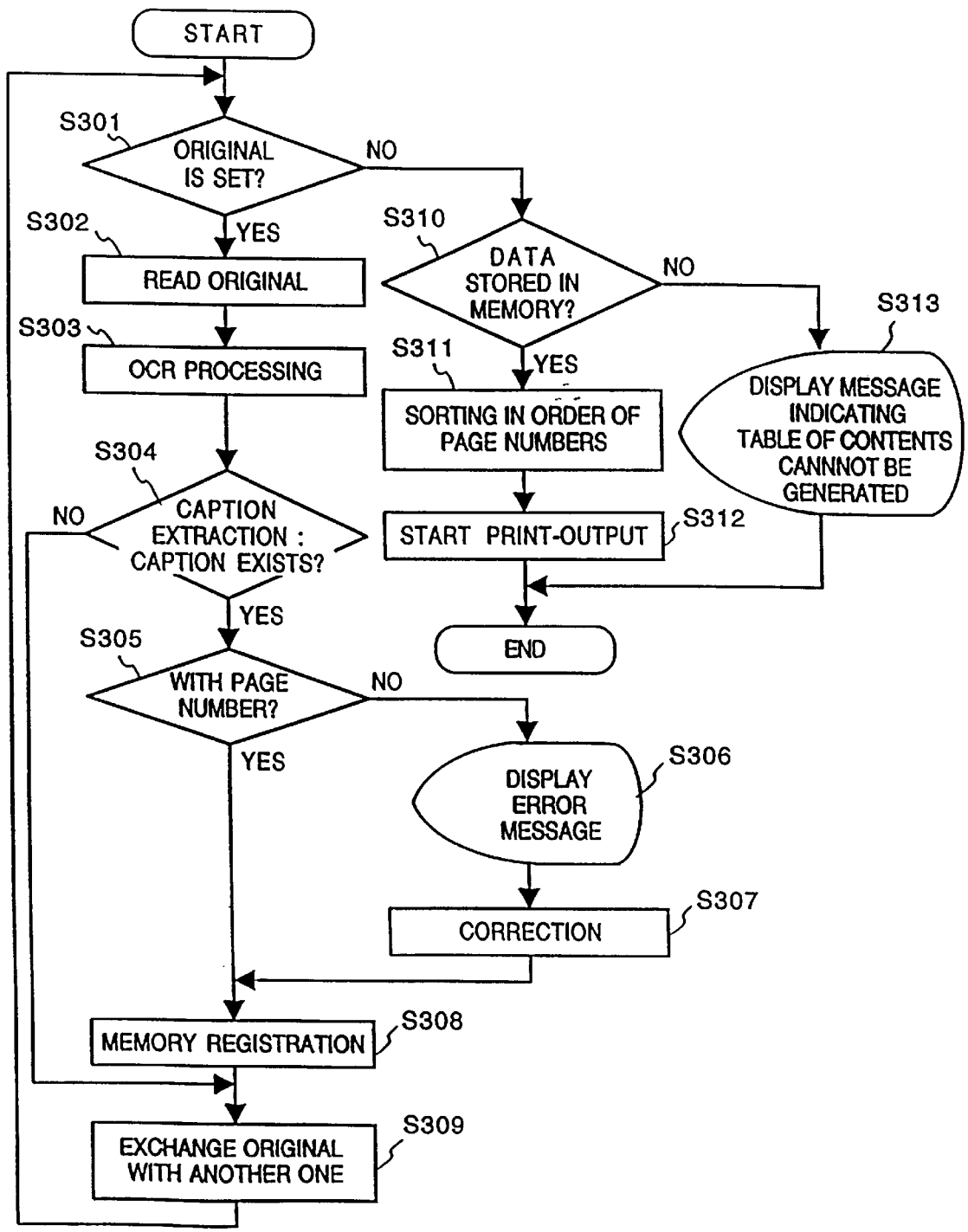
FIG. 10 is a flowchart showing processing by an image processor according to the second embodiment.

Next, processing by the above-mentioned image processor 1404 will be described with reference to the flowchart of FIG. 10.

First, at step S301, whether or not an original is set is checked. If YES, the process proceeds to step S302, at which the scanner 1402 reads the original, and at step S303, the OCR 1403 performs character recognition on the read image data. Next, at step S304, whether or not there is a caption among the character data is checked. If a caption is found, it is extracted. At the following step S305, whether or not there is a page number is checked. If a page number is found, the process proceeds to step S308, at which the extracted caption and the page number are stored, as a pair, into the memory 1405 (registration processing). Note that the above caption extraction is similar to that of the first embodiment, therefore the explanation of the caption extraction will be omitted. However, extraction of page number will be described in detail later with reference to FIG. 12.

At step S305, if there is no page number, the process proceeds to step S306, at which an error message is displayed on a display portion of the operation panel 1407. Next, at step S307, a proper page number is inputted from the operation panel 1407. As the correction (input) has been completed, the process proceeds to step S308 to perform the above registration processing.

On the other hand, at step S304, if there is no caption among the character data, when the registration processing at step S308 has been completed, the process proceeds to step S309 at which the next page is read with another page. The exchange is made using the DF 1401 [in FIG. 8] or the like. Then, returning to step S301 at which existence/absence of original is determined, the next image data is inputted.

In the above processing, when reading of all the original pages has been completed, the process proceeds to step S310, at which whether or not data on captions and page numbers are stored in the memory 1405 is checked. If data on captions and page numbers are found, the process proceeds to step S311, at which a table of contents is formed by sorting the page numbers registered in the memory 1405 in ascending order. Next, at step S312, the data on the formed table of contents is transferred to the printer 1406, thus output of the table of contents is started, and then the process ends. At step S310, if there is no data on captions and page numbers in the memory 1405, the process proceeds to step S313, at which a message indicative of status where a table of contents cannot be formed is displayed at the display portion of the operation panel 1407, and then the process ends.

Figure 11:
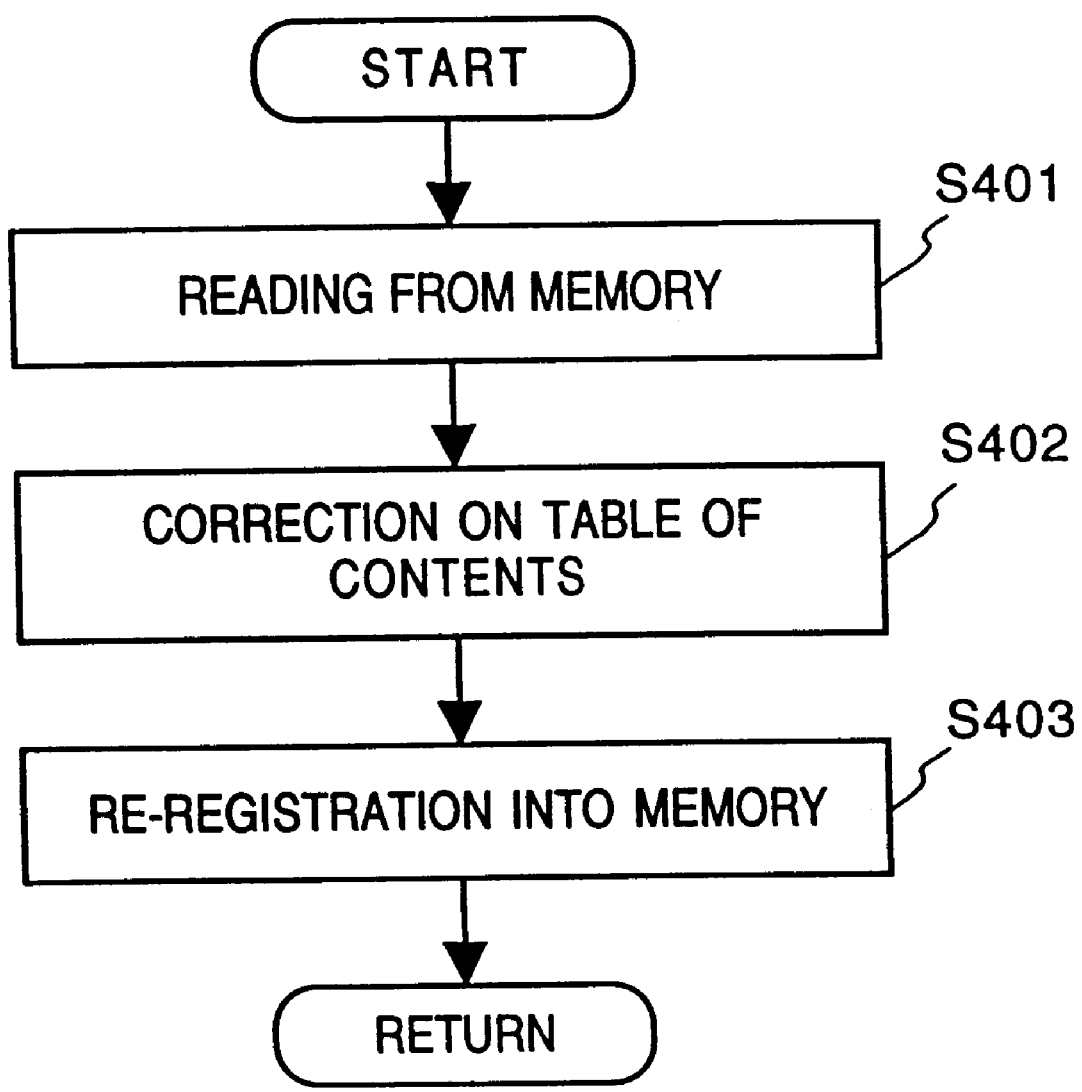
FIG. 11 is a flowchart showing correction processing according to the second embodiment.

Next, the above-mentioned page-number correction (input) processing will be described with reference to the flowchart of FIG. 11.

First, at step S401, data to be corrected is read out of the memory 1405, and at step S402, correction on caption(s) or page number(s) is made by input from the operation panel 1407. Thereafter, as correction on a table of contents has been completed, the corrected data is re-registered into the memory 1405 at step S403, and then the process ends.

Figure 12:
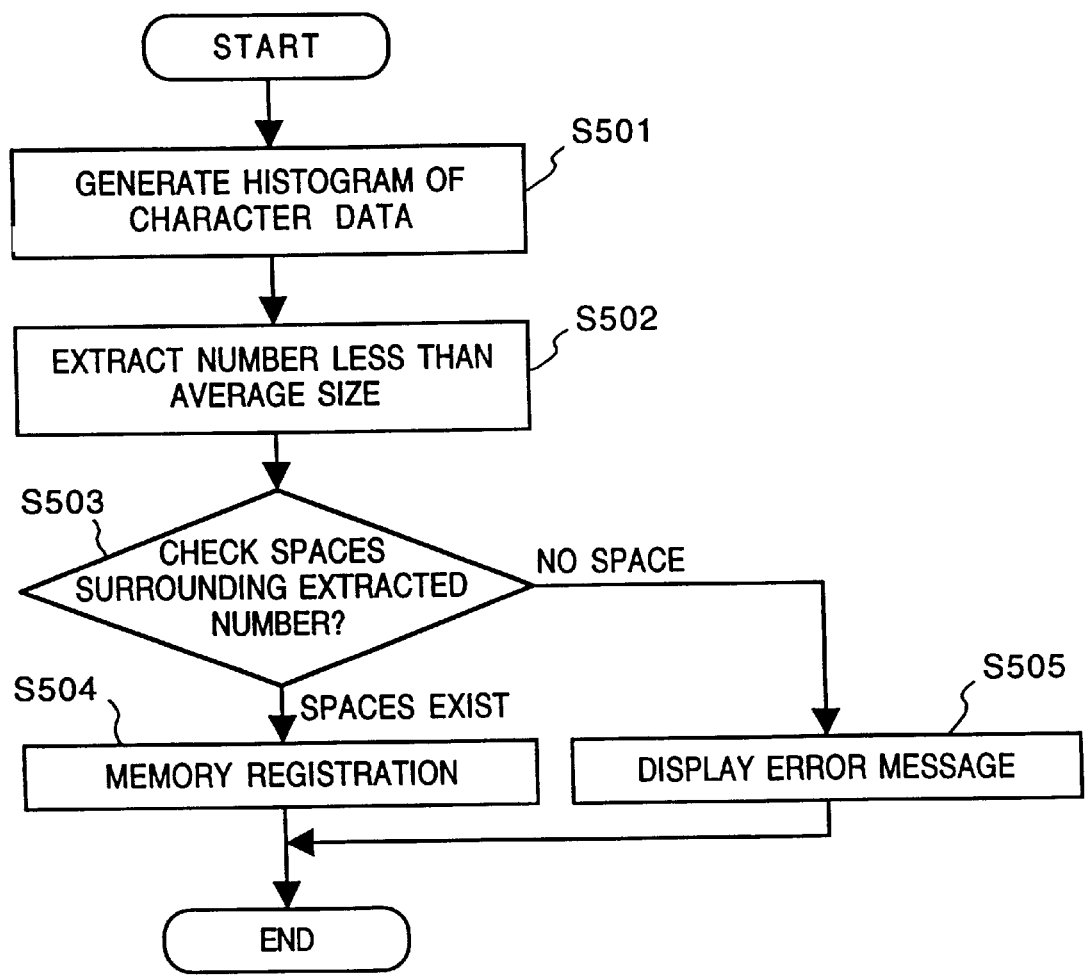
FIG. 12 is a flowchart showing page-number extraction processing according to the second embodiment.

Next, the above-mentioned page number extraction processing will be described with reference to the flowchart of FIG. 12.

First, similar to the caption extraction processing, a histogram of character data character-recognized by the OCR 1403 is generated at step S501. At step S502, a page number less than an average character size in the histogram (101 in FIG. 7) is picked up. Next, at step S503, upper and lower line spaces and right and left spaces to the number are checked. If the spaces surrounding the picked up number, i.e., space between characters in the histogram is equal to or larger than a predetermined standard value, the process proceeds to step S504, at which the data is registered as a page number. If the spaces surrounding the number are less than the predetermined standard value, the process proceeds to step S505, at which an error message is displayed at the display portion on the operation panel 1407.

Further, as shown in FIG. 13, if there are two or more captions (captions 1601 and 1602 in FIG. 13) in the same page, the page number (1603 in FIG. 13) extracted by the page number extraction is outputted to the associated caption (1602 in FIG. 13).

In this manner, according to the second embodiment, it is possible to extract captions and page numbers and automatically generate a table of contents.

[Third Embodiment]

Next, a third embodiment of the present invention will be described below with reference to the drawings.

The third embodiment will be described as a case where a table of contents is generated with respect to an original having unnumbered pages. In this case, first, copying of the original is made, and page numbers are recorded at a predetermined position of image data by add-on (overlaying copying) which is one of functions of copying machines. If the copying apparatus has a page memory, image data both sides page-number data are synthesized on the memory, at one scanning, and a copy page is outputted in accordance with the synthesized image data. Note that the construction of the copying apparatus is similar to that of the second embodiment, therefore the explanation of the construction will be omitted.

Figure 14:
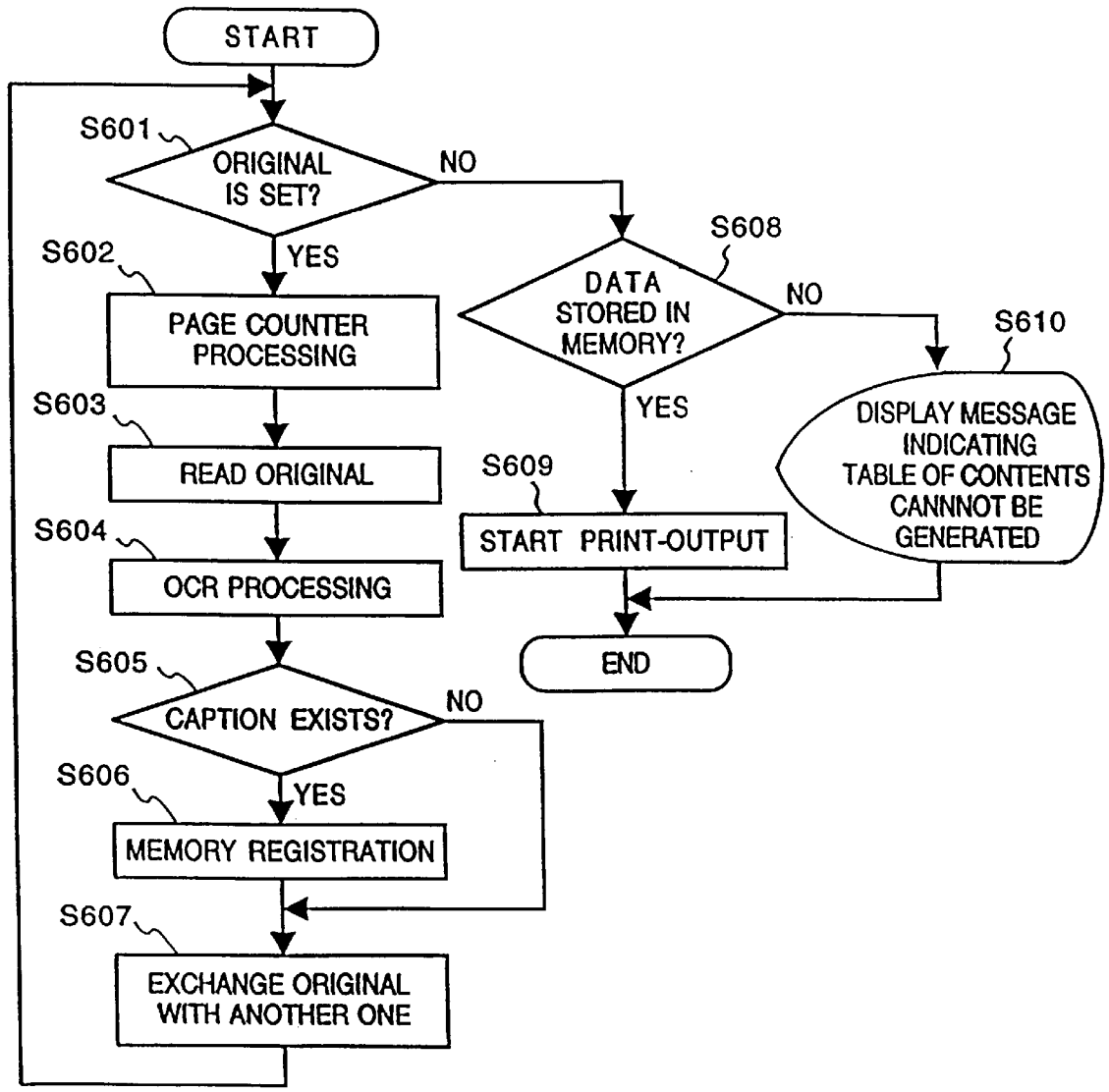
FIG. 14 is a flowchart showing processing by an image processor according to a third embodiment.

FIG. 14 is a flowchart showing processing by the image processor 1404 according to the third embodiment.

At step S601, whether or not an original is set is checked. If YES, the process proceeds to step S602, at which a value of a page counter is incremented by one (+1), so as to maintain the correspondence between page numbers and actual pages. Next, at step S603, the scanner 1402 inputs image data from the original, and at step S604, the OCR 1403 performs character recognition. At step S605, whether or not there is a caption among character data is checked. If a caption is found, the caption and a page number based on the page counter value are registered, as a pair, into the memory 1405 at step S606. At step S605, if there is no caption among the character data, after the page number is registered at step S606, the process proceeds to step S607 at which the original page is exchanged for another original page. The process returns to step S601 to check existence/absence of original and input the next original.

By the above processing, as reading of all the original pages has been completed, the process proceeds to step S608 to check whether or not data on captions and page numbers are stored in the memory 1405. If YES, the process proceeds to step S609, at which the data on the captions and page numbers are transferred to the printer 1406, to start output of a table of contents. At step S608, if there is no data on the captions and page numbers, the process proceeds to step S610, at which a message indicating that a table of contents cannot be generated at the display portion of the operation panel 1407, and the process ends.

According to the second and third embodiments, even if an original has pages with disordered page numbers or unnumbered pages, a table of contents can be easily generated by merely inputting an original.

The present invention can be applied to a system constituted by a plurality of devices or to an apparatus comprising a single device.

Furthermore, the invention is also applicable to a case where the invention is embodied by supplying a program to a system or apparatus. In this case, a storage medium, storing a program according to the invention, constitutes the invention. The system or apparatus installed with the program read from the medium realizes the functions according to the invention.

As described above, according to the second and third embodiments, an image forming apparatus that automatically edits a table of contents of input original, thus improving utility for users, and an editing method for the apparatus can be provided.

The present invention is not limited to the above embodiments and various changes and modifications can be made within the spirit and scope of the present invention. Therefore, to apprise the public of the scope of the present invention, the following claims are made.

What is claimed is:

1. A copying apparatus comprising:

reading means for reading a plurality of images, at least one of the images including a caption image;

detection means for detecting the image including the caption image;

recording means for recording images on both sides of a recording sheet in a both sides recording mode; and means for preventing an image including a caption image from being recorded on a back side of a recording sheet by determining whether the image including the caption image will be recorded on a back side of a recording sheet and, when such a determination is made, controlling recording performed by said recording means so that a back side is left blank so that the image including the caption image is recorded on a front side of a recording sheet.

2. A copying apparatus comprising:

reading means for reading a plurality of images, at least one of the images including a caption image;

recognition means for recognizing characters representing the caption image;

detection means for detecting a page number of the image including the caption image;

generation means for generating an image of a table of contents, based on the result of the recognition by said recognition means and the result of detection by said detection means; and recording means for recording the image of the table of contents generated by said generation means on a recording sheet.

3. An image processing apparatus comprising:

detection means for detecting an image including a caption image;

recording means for recording images on both sides of a recording sheet in a both sides recording mode; and means for preventing an image including a caption image from being recorded on a back side of a recording sheet by determining whether the image including the caption image will be recorded on a back side of a recording sheet and, when such a determination is made, controlling recording performed by said recording means so that a back side is left blank so that the image including the caption image is recorded on a front side of a recording sheet.

4. The apparatus according to claim 1, wherein said detection means detects an image including large-sized characters as the image including the caption image.

5. The apparatus according to claim 1, wherein said detection means detects the caption image based on a space between characters in the image.

6. The apparatus according to claim 2, wherein said detection means detects the page numbers counting a page number of the image.

7. The apparatus according to claim 2, wherein said detection means detects page numbers in the image.

8. The apparatus according to claim 3, wherein said detection means detects an image including large-sized characters as the image including the caption image.

9. The apparatus according to claim 3, wherein said detection means detects the caption image based on a space between characters in the image.

10. A copy method comprising:

a reading step of reading a plurality of images, at least one of the images including a caption image;

a detection step of detecting the image including the caption image;

a recording step of recording images on both sides of a recording sheet in a both sides recording mode; and a preventing step of preventing an image including a caption image from being recorded on a back side of a recording sheet by determining whether the image including the caption image will be recorded on a back side of a recording sheet and, when such a determination is made, controlling recording performed in said recording step so that a back side is left blank so that the image including the caption image is recorded on a front side of a recording sheet.

11. A copying method comprising:

a reading step of reading a plurality of images, at least one of the images including a caption image;

a recognition step of recognizing characters representing the caption image;

a detection step of detecting a page number of the image including the caption image;

a generation step of generating an image of a table of contents, based on the result of the recognition in said recognition step and the result of detection in said detection step; and a recording step of recording the image of the table of contents generated in said generation step on a recording sheet.

12. An image processing method comprising:

a detection step of detecting an image including a caption image; and a preventing step for preventing an image including a caption image from being recorded on a back side of a recording sheet by determining whether the image including the caption image will be recorded on a back side of a recording sheet and, when such a determination is made, controlling recording of an image recording apparatus for recording images on both sides of a recording sheet in a both sides recording mode so that a back side is left blank so that the image including the caption image is recorded on a front side of a recording sheet.

13. The method according to claim 10, wherein said detection step detects an image including large-sized characters as the image including the caption image.

14. The method according to claim 10, wherein said detection step detects the caption image based on a space between characters in the image.

15. The method according to claim 11, wherein said detection step detects the page numbers counting a page number of the image.

16. The method according to claim 11, wherein said detection step detects page numbers in the image.

17. The method according to claim 12, wherein said detection step detects an image including large-sized characters as the image including the caption image.

18. The method according to claim 12, wherein said detection step detects the caption image based on a space between characters in the image.

* * * * *

UNITED STATES PATENT AND TRADEMARK OFFICE
CERTIFICATE OF CORRECTION

PATENT NO. : 5,940,583

DATED : August 17, 1999

INVENTOR(S): MASAYOSHI TAIRA, ET AL.

It is certified that error appears in the above-identified patent and that said Letters Patent is hereby corrected as shown below:

```
Title page,
 Inventors: [75]

"Yokohamai" (both occurrences) should read
--Yokohama--.
```

References Cited [56]

```
   U.S. PATENT DOCUMENTS

"4,860,376   8/1989   Tanaka et al." should read
 --4,860,376   8/1989   Tanka et al.--.
```

COLUMN 1

```
    Line 7, "is" should read --is on the--, and "the"
should read--a--.
    Line 12, "copying" should read --the copying--.
    Line 21, "situation" should read --problems--.
    Line 23, "output" should read --its output--, and
"of" should read --of a--.
    Line 36, "output" should read --the ouput
thereof--.
```

UNITED STATES PATENT AND TRADEMARK OFFICE
CERTIFICATE OF CORRECTION

PATENT NO. : 5,940,583

DATED : August 17, 1999

INVENTOR(S): MASAYOSHI TAIRA, ET AL.

It is certified that error appears in the above-identified patent and that said Letters Patent is hereby corrected as shown below:

COLUMN 1

Line 48, "document," should read --a document,--, and "attains" should read --attaining--.
    Line 53, "contents" should read --content--.
    Line 56, "contents" should read --content--.
    Line 57, "contents," should read --content,--.
    Line 58, "the-contents" should read --the contents--.
    Line 61, "of document part" should read --of a part of a document--.
    Line 64, "using" should read --and using--.

COLUMN 2

Line 4, "contents" should read --content--.
    Line 10, "contents" should read --content--.
    Line 12, "contents" should read --content--.
    Line 15, "of document part" should read --a part of a document--.

UNITED STATES PATENT AND TRADEMARK OFFICE
CERTIFICATE OF CORRECTION

PATENT NO. : 5,940,583

DATED : August 17, 1999

INVENTOR(S): MASAYOSHI TAIRA, ET AL.

It is certified that error appears in the above-identified patent and that said Letters Patent is hereby corrected as shown below:

COLUMN 2

Line 46, "copying" should read --a copying--.
Line 49, "original" should read --an original--, and "output" should read --an output--.

COLUMN 3

Line 17, "copying" should read --the copying--.
Line 22, "settings" should read --settings,--.
Line 34, "image" should read --the image--.
Line 35, "image" should read --the image--.
Line 49, "content" should read --the content--.
Line 50, "knowledge" should read --the knowledge--.
Line 51, "general" should read --a general--.
Line 52, "knowledge" should read --a knowledge--.

COLUMN 4

Line 11, "document" should read --a document--.
Line 13, "serially two sheets." should read --two sheets serially--.

UNITED STATES PATENT AND TRADEMARK OFFICE
CERTIFICATE OF CORRECTION

PATENT NO. : 5,940,583

DATED : August 17, 1999

INVENTOR(S): MASAYOSHI TAIRA, ET AL.

It is certified that error appears in the above-identified patent and that said Letters Patent is hereby corrected as shown below:

COLUMN 4

```
Line 22, "13," should read --13 denote,--.
Line 25, "15," should read --15 denote--.
Line 26, "then" should read --which are then--.
Line 27, "drive' should read --the drive--.
Line 28, "timing" should read --a timing--.
Line 34, "17," should read --17 denotes--.
Line 35, "18," should read --18 denotes--.
Line 38, "19," should read --19 denotes--.
Line 39, "to" should read --to a--.
Line 46, "502," should read --502 denotes--.
Line 48, "503," should read --503 denotes--, and
--"504," should read --504 denotes--.
Line 49, "505," should read --505 denotes--.
Line 50, "copying" should read --a copying--.
Line 51, "506," should read --506 denotes--.
```

UNITED STATES PATENT AND TRADEMARK OFFICE
CERTIFICATE OF CORRECTION

PATENT NO. : 5,940,583

DATED : August 17, 1999

INVENTOR(S): MASAYOSHI TAIRA, ET AL.

It is certified that error appears in the above-identified patent and that said Letters Patent is hereby corrected as shown below:

COLUMN 4

Line 52, "canceling copying" should read --cancelling a copying", and "507," should read --507 denotes--.
    Line 53, "508," should read --508 denotes--.
    Line 54, "509," should read --509 denotes--.
    Line 56, "510," should read --510 denotes--.
    Line 57, "511," should read --511 denotes--.
    Line 59, "512," should read --512 denotes--, and "set" should read --the set--.
    Line 60, "513," should read --513 denotes--.
    Line 65, "standard" should read --the standard--, and "another; 515," should read --another size; 515 denotes--.
    Line 66, "516," should read --516 denotes.

COLUMN 5

Line 1, "517," should read --517 denotes--.
    Line 2, "518," should read --518 denotes--.
    Line 3, "519," should read --519 denotes--.
    Line 5, "520," should read --520 denotes--.

UNITED STATES PATENT AND TRADEMARK OFFICE
CERTIFICATE OF CORRECTION

PATENT NO. : 5,940,583

DATED : August 17, 1999

INVENTOR(S): MASAYOSHI TAIRA, ET AL.  Page 6 of 10

It is certified that error appears in the above-identified patent and that said Letters Patent is hereby corrected as shown below:

<u>COLUMN 5</u>

Line 6, "521," should read --521 denotes--.
    Line 7, "522," should read --522 denotes--.
    Line 8, "524," should read --524 denotes--.
    Line 13, "526," should read --526 denotes--.
    Line 15, "527," should read --527 denotes--.
    Line 16, "528," should read --528 denotes--.
    Line 17, "529," should read --529 denotes--.
    Line 18, "530, a" should read --530 denotes an--.
    Line 20, "531," should read --531 denotes--.
    Line 21, "532," should read --532 denotes--.
    Line 23, "533," should read --533 denotes--.
    Line 26, "534," should read --534 denotes--.
    Line 31, "an original size designated)," should read --a designated original size),--.
    Line 34, "spread book size designated)." should read --designated spread book).--.

UNITED STATES PATENT AND TRADEMARK OFFICE
CERTIFICATE OF CORRECTION

PATENT NO. : 5,940,583

DATED : August 17, 1999

INVENTOR(S): MASAYOSHI TAIRA, ET AL.

It is certified that error appears in the above-identified patent and that said Letters Patent is hereby corrected as shown below:

COLUMN 5

Line 36, "536," should read --536 denotes--.
Line 40, "(point designation." should read --(point designation).--.
Line 41, "zooming" should read --a zooming--.
Line 42, "zomming" should read --the zooming--.
Line 56, "544," should read --544 denotes--.
Line 59, "545," should read --545 denotes--.
Line 60, "546," should read --546 denotes--.
Line 62, "547," should read --547 denotes--.
Line 63, "548," should read --548 denotes--.
Line 64, "550," should read --550 denotes--.
Line 66, "551," should read --551 denotes--.
Line 67, "552," should read --552 denotes--.

COLUMN 6

Line 1, "image" should read --the image--.
Line 2. "555," should read --555 denotes--.
Line 3, "apparatus" should read --the apparatus--.
Line 5, "displaying" should read --and displaying--.

UNITED STATES PATENT AND TRADEMARK OFFICE
CERTIFICATE OF CORRECTION

PATENT NO. : 5,940,583

DATED : August 17, 1999

INVENTOR(S): MASAYOSHI TAIRA, ET AL.

Page 8 of 10

It is certified that error appears in the above-identified patent and that said Letters Patent is hereby corrected as shown below:

COLUMN 6

```
    Line 7, "copying" should read --a copying--.
    Line 30, "pages" should read --the pages--.
    Line 32, "original" should read --the original--.
    Line 34, "copying" should read --and copying--.
    Line 43, "on" should read --and on--, and "if"
should read --if it is--.
    Line 48, "captioned" should read --the captioned--.
    Line 49, "original" should read --the original--.
    Line 56, "if" should read --if it is--.
    Line 57, "then" should read --and then--.
    Line 58, "it" should read --its--.
    Line 67, "recording" should read --the recording--.
```

COLUMN 7

```
    Line 21, "line" should read --a line--.
    Line 26, "104," should read --104 denotes--.
    Line 33, "difference(s)" should read --a difference
or there are differences--.
```

UNITED STATES PATENT AND TRADEMARK OFFICE
CERTIFICATE OF CORRECTION

PATENT NO. : 5,940,583

DATED : August 17, 1999

INVENTOR(S): MASAYOSHI TAIRA, ET AL.

It is certified that error appears in the above-identified patent and that said Letters Patent is hereby corrected as shown below:

<u>COLUMN 7</u>

Line 35, "difference(s)" should read --a difference or there are differences--.
    Line 42, "user's" should read --the user's--.
    Line 46, "specific" should read --a specific--, and "array(s)" should read --array or arrays.--.

<u>COLUMN 8</u>

Line 3, "table" should read --a table--.
    Line 9, "caption(s)" should read --a caption or captions--.
    Line 10, "caption(s) is" should read --a caption is or captions are--.
    Line 16, "on" should read --of--.
    Line 35, "page" should read --a page--.
    Line 50, "original" should read --the original--.
    Line 60, "thus" should read --and thus,--.
    Line 64, "status" should read --the status--.

UNITED STATES PATENT AND TRADEMARK OFFICE
CERTIFICATE OF CORRECTION

PATENT NO. : 5,940,583

DATED : August 17, 1999

INVENTOR(S): MASAYOSHI TAIRA, ET AL.

It is certified that error appears in the above-identified patent and that said Letters Patent is hereby corrected as shown below:

COLUMN 9

```
    Line 6, "on" should read --of--.
    Line 42, "functions" should read --the functions--.
    Line 43, "data" should read --data with--.
    Line 48, "therefore" should read --and therefore--.
    Line 66, "existence/" should read --the
existence/--.
```

COLUMN 10

```
    Line 28, "input" should read --an input--.
```

Signed and Sealed this

Fourteenth Day of November, 2000

Attest:

Q. TODD DICKINSON

*Attesting Officer*     *Director of Patents and Trademarks*